US007546288B2

(12) United States Patent
Springer, Jr. et al.

(10) Patent No.: US 7,546,288 B2
(45) Date of Patent: Jun. 9, 2009

(54) MATCHING MEDIA FILE METADATA TO STANDARDIZED METADATA

(75) Inventors: Thomas Brian Springer, Jr., Redmond, WA (US); Jason E. D. McCartney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 10/654,726

(22) Filed: Sep. 4, 2003

(65) Prior Publication Data
US 2005/0055372 A1    Mar. 10, 2005

(51) Int. Cl.
G06F 7/00     (2006.01)
G06F 17/30    (2006.01)

(52) U.S. Cl. .................. 707/3; 707/1; 707/2; 707/5; 707/10; 707/100; 707/101; 707/104.1

(58) Field of Classification Search .............. 707/104.1, 707/5, 102
See application file for complete search history.

(56) References Cited

U.S. PATENT DOCUMENTS

| 4,991,094 | A  |    | 2/1991  | Fagan et al. |
| 5,832,495 | A  |    | 11/1998 | Gustman |
| 5,862,325 | A  | *  | 1/1999  | Reed et al. .................. 709/201 |
| 6,282,548 | B1 | *  | 8/2001  | Burner et al. ............ 707/104.1 |
| 6,311,194 | B1 | *  | 10/2001 | Sheth et al. ................. 715/505 |
| 6,345,256 | B1 |    | 2/2002  | Milsted et al. |
| 6,389,412 | B1 |    | 5/2002  | Light |
| 6,546,388 | B1 |    | 4/2003  | Edlund et al. |
| 6,760,721 | B1 |    | 7/2004  | Chasen et al. |
| 6,785,688 | B2 | *  | 8/2004  | Abajian et al. .............. 707/102 |
| 6,877,002 | B2 | *  | 4/2005  | Prince .......................... 707/5 |
| 6,877,134 | B1 | *  | 4/2005  | Fuller et al. ................. 715/202 |
| 6,947,947 | B2 | *  | 9/2005  | Block et al. ................. 707/102 |
| 6,973,451 | B2 |    | 12/2005 | Laronne et al. |
| 7,181,438 | B1 | *  | 2/2007  | Szabo .......................... 707/2 |
| 7,308,464 | B2 | *  | 12/2007 | Nowitz et al. ............. 707/104.1 |
| 2002/0099737 | A1 |  | 7/2002  | Porter et al. |
| 2002/0103920 | A1 |  | 8/2002  | Berkun et al. |
| 2002/0107973 | A1 |  | 8/2002  | Lennon et al. |
| 2002/0152267 | A1 |  | 10/2002 | Lennon et al. |
| 2002/0188841 | A1 | * | 12/2002 | Jones et al. ................. 713/153 |
| 2003/0084460 | A1 |  | 5/2003  | Chung et al. |
| 2003/0093790 | A1 |  | 5/2003  | Logan et al. |
| 2003/0120651 | A1 |  | 6/2003  | Bernstein et al. |

(Continued)

OTHER PUBLICATIONS

Roantree, "Metadata Management in Federated Multimedia Systems," Proceedings of the Thirteenth Australasian Conference on Database Technologies, 2002, pp. 147-155, vol. 5, Australian Computer Society, Inc., Darlinghurst, Australia.

(Continued)

Primary Examiner—Hosain T Alam
Assistant Examiner—Usmaan Saeed
(74) Attorney, Agent, or Firm—Senniger Powers LLP

(57) ABSTRACT

Providing standardized metadata associated with media content responsive to input metadata. The invention extracts one or more tokens from the input metadata. Each of the extracted tokens represents a portion of the input metadata. The invention creates a token group comprising a plurality of selected tokens. The invention searches the database of standardized metadata using a multi-pass approach using the token group and the extracted tokens to identify the standardized metadata associated with the input metadata.

37 Claims, 8 Drawing Sheets

U.S. PATENT DOCUMENTS

| | | | |
|---|---|---|---|
| 2003/0195863 A1* | 10/2003 | Marsh | 707/1 |
| 2003/0233349 A1* | 12/2003 | Stern et al. | 707/3 |
| 2005/0022115 A1* | 1/2005 | Baumgartner et al. | 715/513 |
| 2005/0203992 A1 | 9/2005 | Tanaka et al. | |

OTHER PUBLICATIONS

Li et al., "Supporting Efficient Multimedia Database Exploration," The International Journal on Very Large Data Bases, Apr. 2001, pp. 312-326, vol. 9, Issue 4, Springer-Verlag New York, Inc., Secaucus, New Jersey, U.S.A.

"Advanced Ra-Renamer-Smart RealAudio File Renaming," printed from http://www.softpointer.com/arr.htm, Aug. 20, 2001, (1 page).

"Tag&Rename—Features," printed from http://www.softpointer.com/tr_features.htm, Apr. 24, 2003, (2 pages).

"Tag&Rename—Easy-to-Use Music Organizer with Freedb/cddb Support," printed from http://www.softpointer.com/tr.htm, Jul. 10, 2003, (4 pages).

"Deferred Tagging has Failed—How to Use Super Tagging," printed from http://www.musicmatch.com/faq/CDL017.htm, 2003, (1 page).

"Super Tagging Returns Too Many Possible Results," printed from http://www.musicmatch.com/faq/TAG011.htm, 2003, (1 page).

* cited by examiner

MATCHING MEDIA FILE METADATA TO STANDARDIZED METADATA

TECHNICAL FIELD

Embodiments of the present invention relate to the field of metadata associated with media content. In particular, embodiments of this invention relate to matching textual metadata from media content files to standardized metadata from a metadata source.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files such as Moving Picture Experts Group audio layer-3 (MP3) files and WINDOWS MEDIA technologies audio (WMA) and video files. The computer typically organizes the media files into playlists when the compressed media files are played on the computer. The files may be organized according to metadata or other property data associated with the media content. Metadata for a digital media file such as an audio file includes general information pertaining to the media file itself. This information is typically stored within the file. For example, an audio file may have metadata tags for the song title, song artist, album title, and a rating. For example, in the case of audio media files, the files may be organized by album, artist, genre, date, or some user-specified selection and ordering. A user easily navigates through this organization using menus and graphical displays to render the desired media files.

However, some media files lack metadata or have metadata that is inconsistent or incomplete. The organization of such media files without sufficient metadata is limited. There is a need for obtaining relevant metadata for such media files. In some existing systems, a user requests updated metadata for the media files by sending, via a media player, the incomplete metadata to the existing system which has access to additional metadata. However, the existing systems often fail to identify the correct media content associated with the received metadata due to the incompleteness or other insufficiency of the received metadata. As such, existing systems often return no metadata or provide incorrect metadata to the user.

Accordingly, a system for matching input textual metadata to standardized metadata is desired to address one or more of these and other disadvantages.

SUMMARY OF THE INVENTION

Embodiments of the invention include software for matching metadata from a media file with standardized metadata from a metadata provider. In one embodiment, the invention includes a web-based service for matching textual information stored in metadata tags to standardized metadata stored in a proprietary database server based on various text processing operations. The client requests metadata for media content stored in a media file from the service by providing (e.g., via an extensible markup language document) any metadata currently stored in the media file. The service responds to the client with a matching set of standardized data, one or more potentially matching sets of data, or an indication that no match could be made (e.g., via another extensible markup language document).

The invention improves the quality and quantity of metadata stored on a client computer by providing software to map existing inconsistent or otherwise incorrect metadata to a standardized set of metadata. The text matching of the invention is flexible in that it overcomes a degree of misspellings, missing words, incorrect ordering of words, and alternate forms of words within the metadata received in the request from the client. In an audio embodiment, the invention is robust in that it reviews all the metadata tags for each music track as well as all the related tracks in the requested set in a holistic fashion. As such, the text matching tolerates incomplete music metadata in the request. Further, the invention processes international text as the text processing may be performed in unicode.

The text-matching service of the invention further enables users who have music tracks with incomplete or inconsistent metadata to identify the music track relative to a standardized set of metadata. The invention provides improved metadata that enables an enhanced playback experience for the user (e.g., by additionally providing cover art and information related to the performer when available). Also, other software components that recognize the metadata tags may manage and organize the music files.

Briefly described, a method embodying aspects of the invention provides metadata associated with media content and stored in a database. The method includes receiving, from a computing device, a request of an item of initial metadata identified by a media file, which stores media content. The method also includes extracting one or more tokens from the item of initial metadata in the received request and selecting a plurality of the extracted tokens to create a token group. In this instance, each of the extracted tokens represents a portion of the item of initial metadata. The method further includes searching the database for additional metadata associated with the media content using the created token group.

Another embodiment involves a method of providing metadata associated with media content and stored in a database. The method includes receiving, from a computing device, a request of metadata associated with media content. The metadata has text strings corresponding to an album title, an artist name, and a track title. The method also includes extracting one or more tokens from the text strings and selecting a plurality of the extracted tokens from the album title text string and the artist name text string to create a first token group. In this instance, each of the extracted tokens represents a substring of the text strings. The method further includes searching the database for additional metadata associated with the media content using the first token group.

One or more computer-readable media having computer-executable components for providing metadata associated with media content and stored in a database embody further aspects of the present invention. The components include an interface component for receiving, from a computing device, a request of an item of initial metadata identified by a media file, which stores media content. The components also include a tokenizer component and a query component. The tokenizer component extracts one or more tokens from the item of initial metadata in the request received by the interface component, each of the extracted tokens representing a portion of the item of initial metadata. The tokenizer component also selects a plurality of the extracted tokens to create a token group. The query component searches the database for additional metadata associated with the media content using the token group created by the tokenizer component.

In yet another embodiment, a web service receives a request, from a computing device, that includes an item of initial metadata identified by a media file. The web service has a tokenizer component for extracting one or more tokens from the item of initial metadata in the received request and selecting a plurality of the extracted tokens to create a token group. In this instance, each of the extracted tokens represents a portion of the item of initial metadata. The service also includes a database storing additional metadata relating to media content in the media file and a query component for searching the database for the additional metadata associated with the media content using the created token group.

A computer-readable medium embodying aspects of the present invention stores a data structure describing an item of media content. The data structure includes a metadata item associated with the media content and one or more tokens. Each of the tokens represents a portion of the metadata item. The data structure also includes a token group including one or more of the tokens.

In yet another embodiment, a method of processeing data for storage on a computer-readable medium includes receiving one or more metadata items from a metadata source. The metadata items are related to media content. The method also includes extracting one or more tokens from the received metadata items. Each of the extracted tokens represents a portion of one or more of the received metadata items. The method further includes selecting a plurality of the extracted tokens to create a token group and storing the received metadata items, the extracted tokens, and the created token group on a computer-readable medium to associate the media content with the stored metadata items, tokens, and token group.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

In one embodiment, the invention includes software for implementing a web service that matches incomplete media content metadata received from a computing device to standardized metadata from a metadata provider. The web service operates, for example, in a media environment such as next described.

Media Environment

Figure 1:
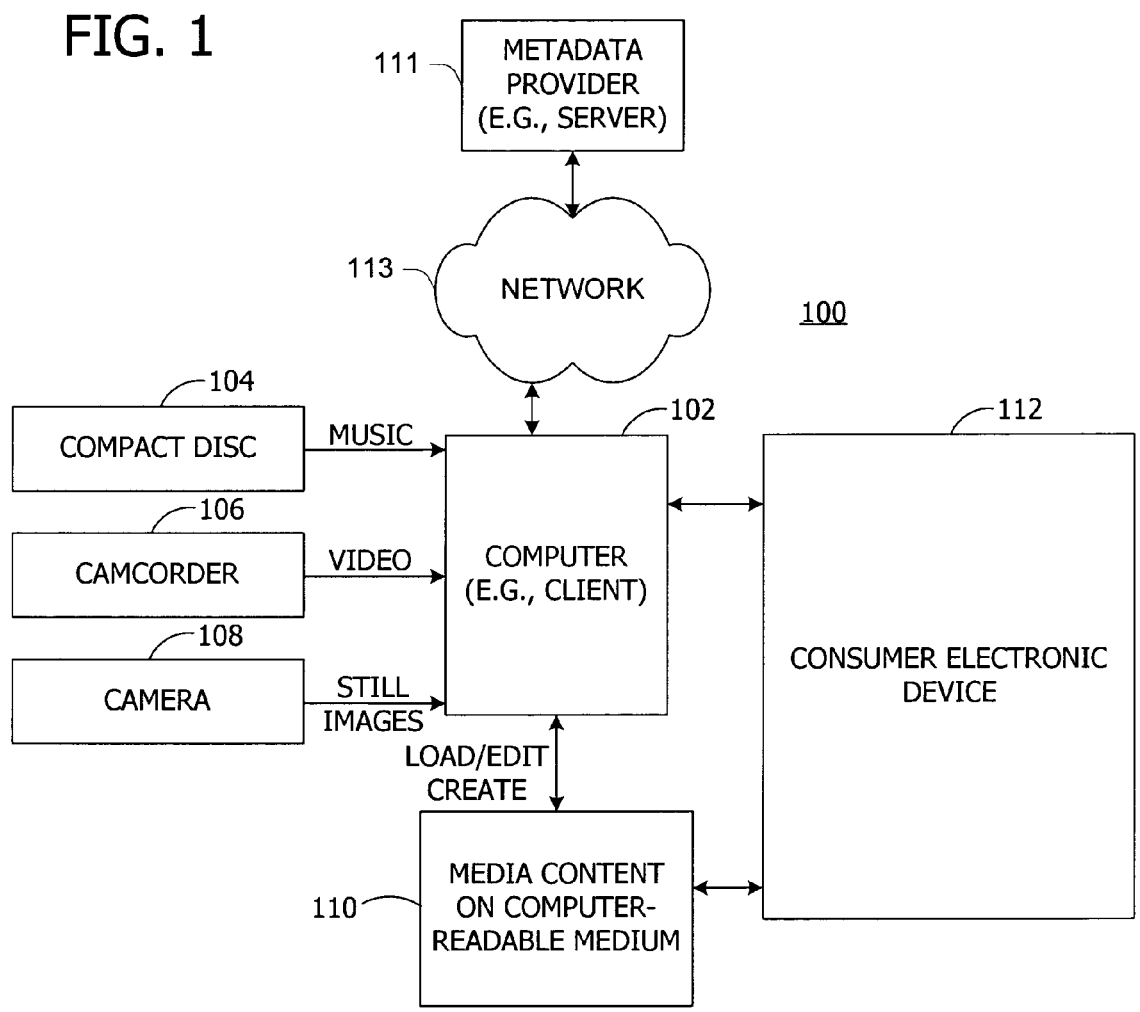
FIG. 1 is a block diagram illustrating one example of a suitable media environment in which the invention may be implemented.

Referring now to the drawings, FIG. 1 illustrates an exemplary multimedia environment in which the invention may be used. A system 100 has one or more computers 102 coupled to one or more devices providing media content including audio data, video data, and/or image data. In addition, the media content may include a book, an electronic book, a radio station broadcast, a publication, or a video game. For example, the devices may include a compact disc (CD) 104, a camcorder 106, or a camera 108. The computer 102 accesses the media content as input and may render or store the media content as a digital media file to a computer-readable medium 110.

In one embodiment, the computer 102 stores media content on a computer-readable medium 110 for use by a media player program associated with a consumer electronic device 112. The consumer electronic device 112 includes any suitable rendering filter or media player or device that is configured to render digital media so that the user can experience the content that is embodied on the medium 110. For example, suitable media player applications include a CD media player and a DVD media player.

Media players, consumer electronic devices 112, or the like may be organized according to the capabilities of the media player. Each media player has a media type that identifies the type of media that the media player is capable of rendering. For example, the media type (also referred to as a playlist summary type, a menu summary type, or the like) includes one or more of the following: audio, video, and still image. Some media players include audio-only players such as portable CD players, car receivers, and DVD players. Other media players further include audio and still image capable players including portable and set-top DVD players optionally capable of rendering images with audio simultaneously. Other media players further include audio, still image, and video capable players. Exemplary consumer electronic devices 112 include, but are not limited to, the following: a portable CD player, a Moving Picture Experts Group audio layer-3 (MP3) player, an audio system in an automobile, a personal digital assistant, a cellular telephone, or the like.

In the examples herein, the media content of the digital media file is described in the context of content embodied on a CD or a DVD. It is to be appreciated and understood that the media content may be embodied on any suitable media, including digital files downloaded to memory accessible by computer 102, and that the specific examples described herein are given to further understanding of the inventive principles. For convenience, a digital media file refers to one or more files representing, for example, a single song track or a collection of tracks such as would be found on an audio CD. The media content may include, without limitation, specially encoded media content in the form of an encoded media file.

One aspect of the invention enables the user or, particularly, enables a media player program executing on computing device 112 or client, to access, retrieve, and display for the user, so-called metadata. For example, the user of consumer electronic device 112 inserts a computer-readable medium storing a digital media file into computer 102, or otherwise causes the content of the digital media file to be experienced. In the embodiment of FIG. 1, a metadata provider 111 stores metadata to the specific media content that is being experienced by the user. Metadata provider 111 focuses on maintaining a vast collection of correct metadata about media content. Metadata provider 111 delivers the metadata to computer 102. In one embodiment, the metadata is available from metadata provider 111 via a data communication network 113. The computer 102 and metadata provider 11 are coupled to the data communication network 113. While the network 113 in this example is the Internet, the teachings of the invention may be applied to any data communication network.

Those skilled in the art are familiar with metadata, which is simply information about data. In the context of the present invention, metadata includes information related to specific content of a digital media file being played on the media player. Basic metadata includes a title, composer, performer, genre, a description of content, and the like. Extended metadata includes cover art, performer biographies, reviews, related performers, where to buy similar items, upcoming concerts, ticket sales, URLs to other related experiences including purchase opportunities, and the like.

In one embodiment, the metadata is stored as metatags embedded within a computer file storing the music data (i.e., the media content). Standards for these metatags include, but are not limited to, ID3v2 for MP3 files and namespaces for WINDOWS MEDIA brand technologies WMA files. For each standard, there are fields (e.g., metatags) known in the art which are used to store information about the media content. This information includes, but is not limited to, an artist name, an album title, a track name, a track number, and a track length. Although these fields have a known meaning or domain for the metadata stored therein, the textual information stored in the fields is arbitrary and may be entered in numerous ways (e.g., by a user or by various media players or other application programs). For example, consider track 3 on The Beatles album "Sgt. Pepper's Lonely Hearts Club Band" entitled "Lucy in the Sky with Diamonds." The tables below illustrate exemplary metatags and text associated with the metatags for this music track.

TABLE 1

One example of metadata stored via metatags for a given music track.

| METADATA TAG | TEXT |
|---|---|
| Artist | The Beatles |
| Album | Sergeant Peppers |
| Track Title | Lucy In The Sky |

TABLE 2

Another example of metadata stored via metatags for a given music track.

| METADATA TAG | TEXT |
|---|---|
| Artist | Beatles |
| Album | Sgt. Pepper's |
| Track Title | Lucy In The Sky With Diamonds |

TABLE 3

Still another example of metadata stored via metatags for a given music track.

| METADATA TAG | TEXT |
|---|---|
| Artist | The Beatles |
| Album | |
| Track Title | Lucy In The Sky (With Diamonds) |

In some cases, the music file lacks data for any of the metatags. In these cases, unstructured metadata (e.g., textual information) may be stored in the filename of the music file. The unstructured textual information does not correspond to known fields or domains. Example file naming conventions for the above music track include the following: 03—The Beatles—Lucy In The Sky, Sergeant Pepper's Lonely Hearts Club Band—03 Lucy In The Sky With Diamonds, and (The Beatles) Sgt. Peppers—Lucy in the Sky with Diamonds.

Overview of Operation

The invention provides data cleansing and data enrichment. Data cleansing aspects of the invention correct various inconsistencies in the initial metadata tags submitted in the request. Data enrichment aspects of the invention supply metadata missing from the request and provide any additional related metadata which is available from the metadata provider or maintained in another database accessible to the invention software. The computing device requesting the standardized metadata applies the standardized metadata to the user's media files (e.g., by replacing the initial metadata stored in the media files or by storing the standardized metadata elsewhere for subsequent retrieval).

This invention also operates on unstructured input metadata received from a client. For example, the invention attempts to ascertain the metadata implicit in the file naming convention. Alternatively, the invention extracts tokens from the entire string of text in the file name and performs various search methods which are processor intensive and may be less successful than searching with metadata identified by metatags.

Figure 2:
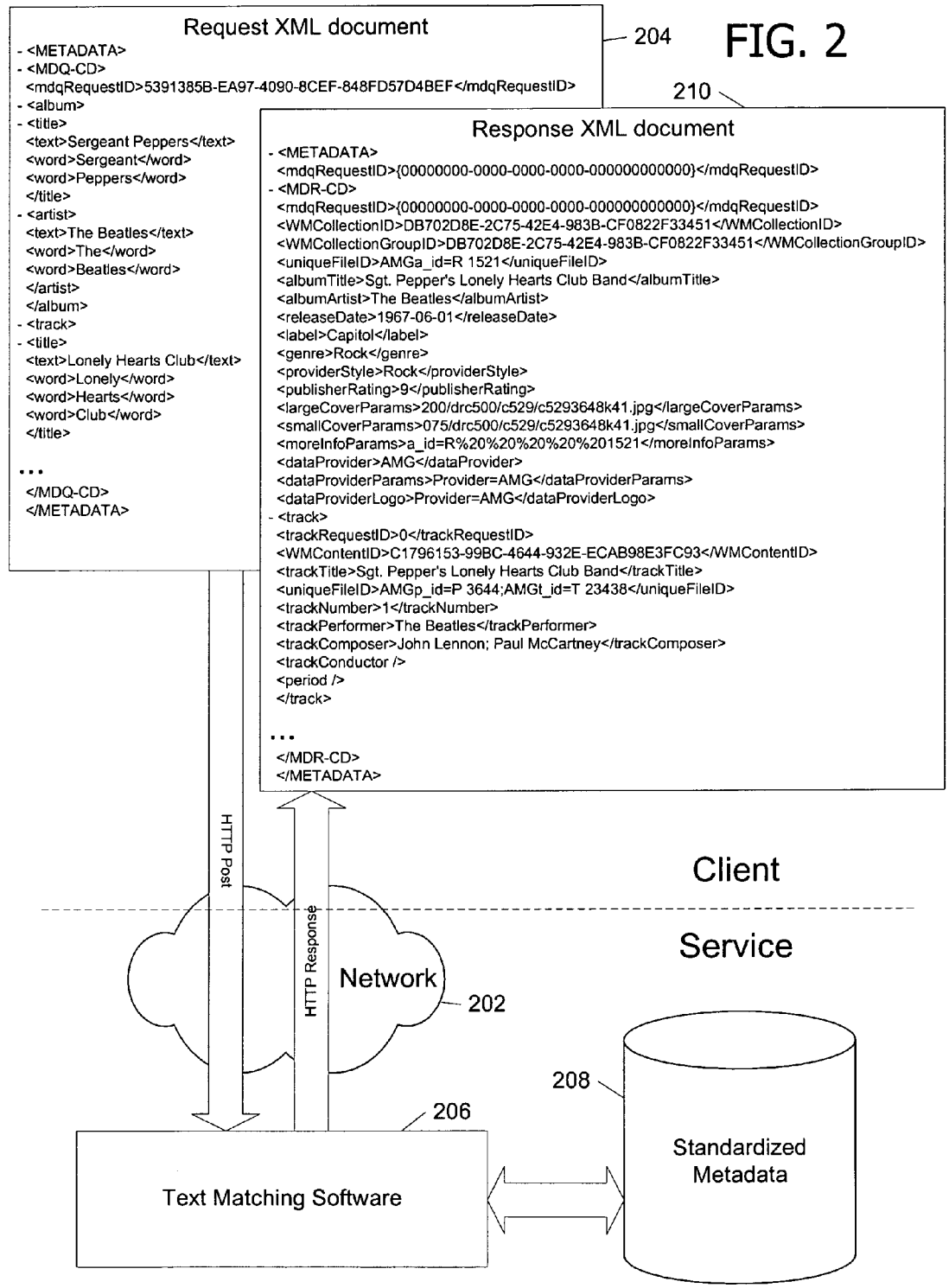
FIG. 2 is an exemplary block diagram illustrating a client interacting with a web service.

Referring next to FIG. 2, an exemplary block diagram illustrates a client interacting with the web service of the invention via a network 202. In one embodiment, the client constructs an extensible markup language (XML) document 204 containing a set of 1 to N related music tracks and associated music metadata tags for each track. The service exists at a well-known network address and accepts the client XML request 204. Text matching software 206 of the service attempts to make a best match between the textual information stored in the music metadata tags contained in the request 204 and a standardized, canonical set of music metadata stored in a database server 208 by searching the metadata stored in the database server 208. Any form of searching the database server 208 or other memory storage area known in the art (e.g., via structured query language commands) is within the scope of the invention. The service constructs and delivers a response XML document 210 containing the matched metadata from the database 208 to the client.

Figure 3:
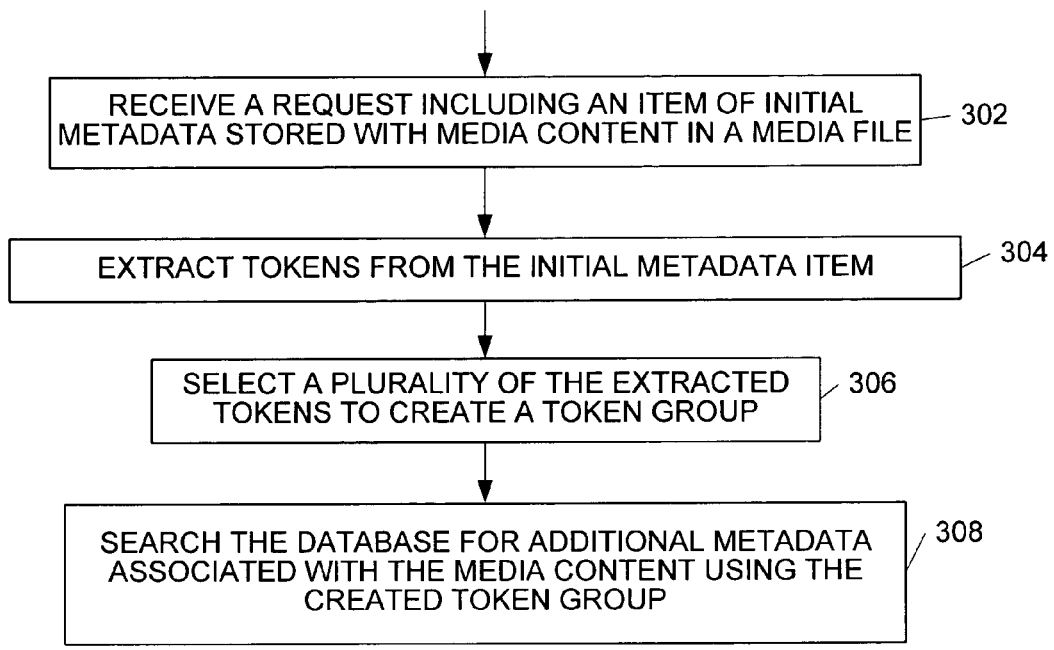
FIG. 3 is an exemplary flow chart illustrating operation of the text matching software of the invention.

Referring next to FIG. 3, an exemplary flow chart illustrates operation of metadata matching software of the invention. The metadata matching software provides metadata associated with media content responsive to a request from a computing device of a user. The software receives, from the computing device, a request including an item of initial metadata (e.g., input metadata) identified by a media file at 302. In one embodiment described herein, the item of metadata is encapsulated in the filename of the media file. In other embodiments, a plurality of items of metadata are included in the request. The media file includes media content stored in a computer-readable medium accessible by the computing device. In one example, the media content comprises audio data, and the item of initial metadata includes, but is not limited to, metadata relating to one or more of the following categories: album title, artist name, track title, and track number. Other media content types have other categories (e.g., movie title, chapter number, scene number).

The invention software extracts one or more tokens from the item of initial metadata in the received request at 304. Each of the extracted tokens represents a portion of the item of initial metadata. For example, if the item of metadata includes a text string identified by metatags, the extracted tokens may represent individual words in the text string. The invention software selects a plurality of the extracted tokens to create a token group or other permutation of the tokens at 306, and searches a database using the created token group for additional metadata at 308. The database stores standardized metadata associated with the media content. Searching the database at 308 includes wildcard searching on portions of the token group (e.g., substring searching). Searching the database at 308 may produce a single match or a plurality of potential matches (e.g., an unranked list of media content items). In one embodiment, the invention software communicates any items of media content and any standardized metadata associated therewith to the requesting device. Additional searches may be performed based on the initial search results as illustrated and described in FIG. 6.

One or more computer-readable media have computer-executable instructions for performing the method illustrated in FIG. 3.

Figure 4:
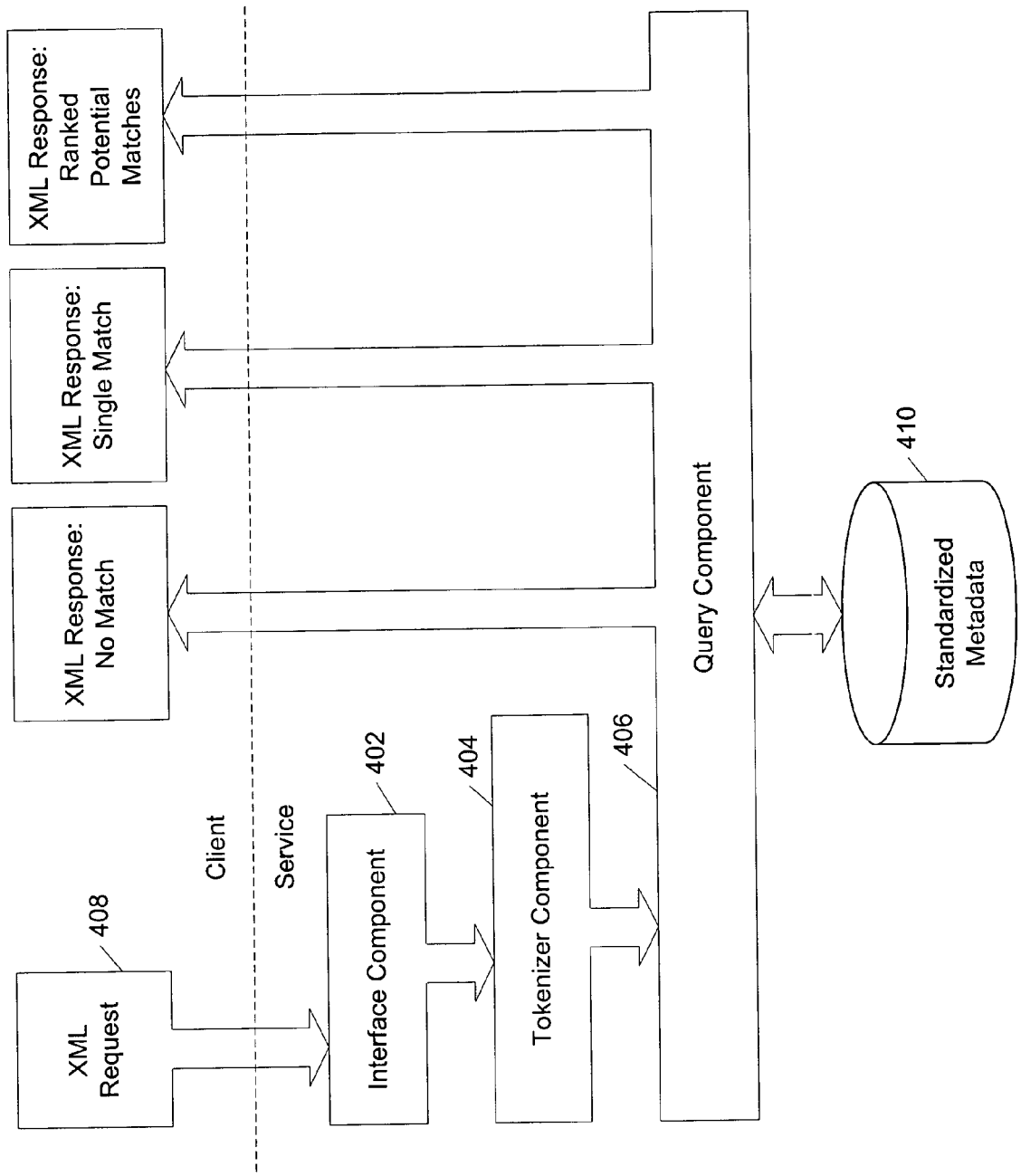
FIG. 4 is an exemplary block diagram illustrating the service architecture of software implementing the invention.
Figure 5:
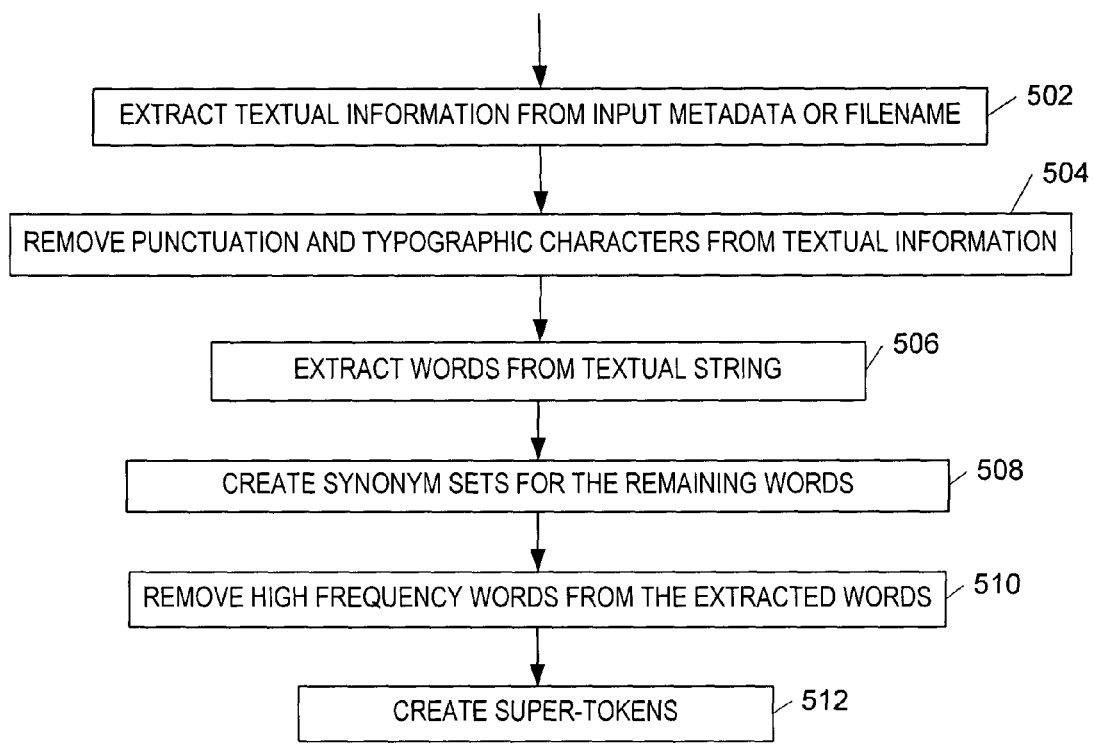
FIG. 5 is an exemplary flow chart illustrating token creation.

Referring next to FIG. 4, an exemplary block diagram illustrates the service architecture of software implementing the invention. In one embodiment, one or more computer-readable media having computer-executable components for providing metadata associated with media content implement the invention. The components include an interface component 402, a tokenizer component 404, and a query component 406. The interface component 402 receives a request 408 (e.g., an XML document) from a computing device of a client for standardized metadata associated with a particular item of media content. The media content is identified in the request 408 by initial metadata obtained from the media file storing the media content on the computing device. The tokenizer component 404 creates tokens from the initial metadata in the request. The query component 406 searches, using the created tokens, a memory area storing standardized metadata 410 relating to media content. The query component 406 provides various responses configurable by the client. The client specifies the desired response type to the web service during a previous communication (e.g., during setup) or in the request 408. In some cases, the client may only be interested in a match or no-match response. This enables automatic matching scenarios which do not require any user intervention. In other cases, the client may be interested in an ordered list of potential matches sorted with the most likely match presented first. This type of response enables the user to do the final matching reconciliation and determine which set of standardized metadata matches the music tracks in the request 408.

In one embodiment, the invention software is implemented as a web service connected to the client via a network (not shown) such as the Internet.

Metadata Query and Return

In one embodiment, the request received from the computing device includes an XML document representing a metadata data query (MDQ) data structure such as illustrated in FIG. 2. Such as illustrated in FIG. 2. An exemplary MDQ data structure includes a request type identifier defining a type for the computer-readable medium storing the media content on the computing device, a request identifier, and one or more initial metadata elements stored with the media content file. An exemplary request type identifier comprises the text strings "MDQ-CD" or "MDQ-DVD." The request type identifier defines a type relating to the various computer-readable media available to the computing device including, but not limited to, a compact disc, a digital versatile disc, and flash memory.

Similarly, the response prepared by the invention software includes an XML document representing a metadata return (MDR) data structure in one embodiment such as also illustrated in FIG. 2. The MDR data structure stores a return type identifier defining the type for the computer-readable medium, the request identifier, and return metadata corresponding to the metadata identified by the invention software while searching the database storing the standardized metadata. Similar to the request type identifier, an exemplary return type identifier comprises the text strings "MDR-CD" or "MDR-DVD."

Tokenizing

Referring next to FIG. 4, an exemplary block diagram illustrates the service architecture of software implementing the invention. In one embodiment, one or more computer-readable media having computer-executable components for providing metadata associated with media content implement the invention. The components include an interface component 402, a tokenizer component 404, and a query component 406. The interface component 402 receives a request 408 (e.g., an XML document) from a computing device of a client for standardized metadata associated with a particular item of media content. The media content is identified in the request 408 by initial metadata obtained from the media file storing the media content on the computing device. The tokenizer component 404 creates tokens from the initial metadata in the request. The query component 406 searches, using the created tokens, a memory area storing standardized metadata 410 relating to media content. The query component 406 provides various responses configurable by the client. The client specifies the desired response type to the web service during a previous communication (e.g., during setup) or in the request 408. In some cases, the client may only be interested in a match or no-match response. This enables automatic matching scenarios which do not require any user intervention. In other cases, the client may be interested in an ordered list of potential matches sorted with the most likely match presented first. This type of response enables the user to do the final matching reconciliation and determine which set of standardized metadata matches the music tracks in the request 408.

Those skilled in the art will appreciate that any tokenizing algorithm may be employed. In one implementation, the input metadata is tokenized by a word splitting approach. In other embodiments, tokens are created from the input metadata at a sub-word level or super-word level. Also, the invention may create synonym sets at 508 (e.g., synsets) with each synonym set representing a single underlying lexical concept. Each synonym set represents alternate forms of the same token. For example, the token "ONE" may also be represented as "1" or "I". Further, common misspellings may be considered as alternate token forms.

After tokenization, various high frequency tokens are removed from the extracted tokens at 510. In the English language, for example, these high frequency tokens include common articles such as "THE", "AND", and "IT" as well as most prepositions. Further, there may be additional high frequency tokens specific to the data domain. For example, in the music data domain, the additional high frequency tokens include words such as "MIX", "LOVE", and "BAND". If the extracted tokens include no tokens other than high frequency tokens, the invention software considers all extracted tokens (i.e., cleansing of the extracted tokens does not occur) when searching.

The extracted, cleansed tokens are reconstructed or otherwise arranged as a series of ordered tokens with the most high frequency (i.e., least distinguishing) tokens removed to improve search efficiency. Referred to as creating super-tokens at 512, each series of ordered tokens (i.e., token groups) represents a permutation of some of the extracted tokens. The super-token describes a single token built from several tokens. Searching the metadata database using super-tokens produces a relatively small set of potential matches with enough of the high-frequency tokens removed from the input string to allow for some degree of misspellings, missing terms, and alternate forms. The degree of misspellings, missing terms, and alternate forms tolerated depends on the amount and type of metadata being searched.

For example, a super-token for the string "Being for the Benefit of Mr. Kite" with various noise words removed is "BEINGBENEFITMRKITE". An example for the string "Sgt. Pepper's Lonely Hearts Club Band" is "SGTPEPPER-SLONELYHEARTSCLUBBAND".

When searching with super-tokens, initial substring searches may be quickly performed to produce potential matches. That is, tokens may be omitted and the search will still yield relevant matches. For example, an initial sub-string search on an input string of "Sgt. Pepper's" yields a match to all media content having associated super-tokens beginning with "SGTPEPPERS".

Multi-pass Matching

Figure 6:
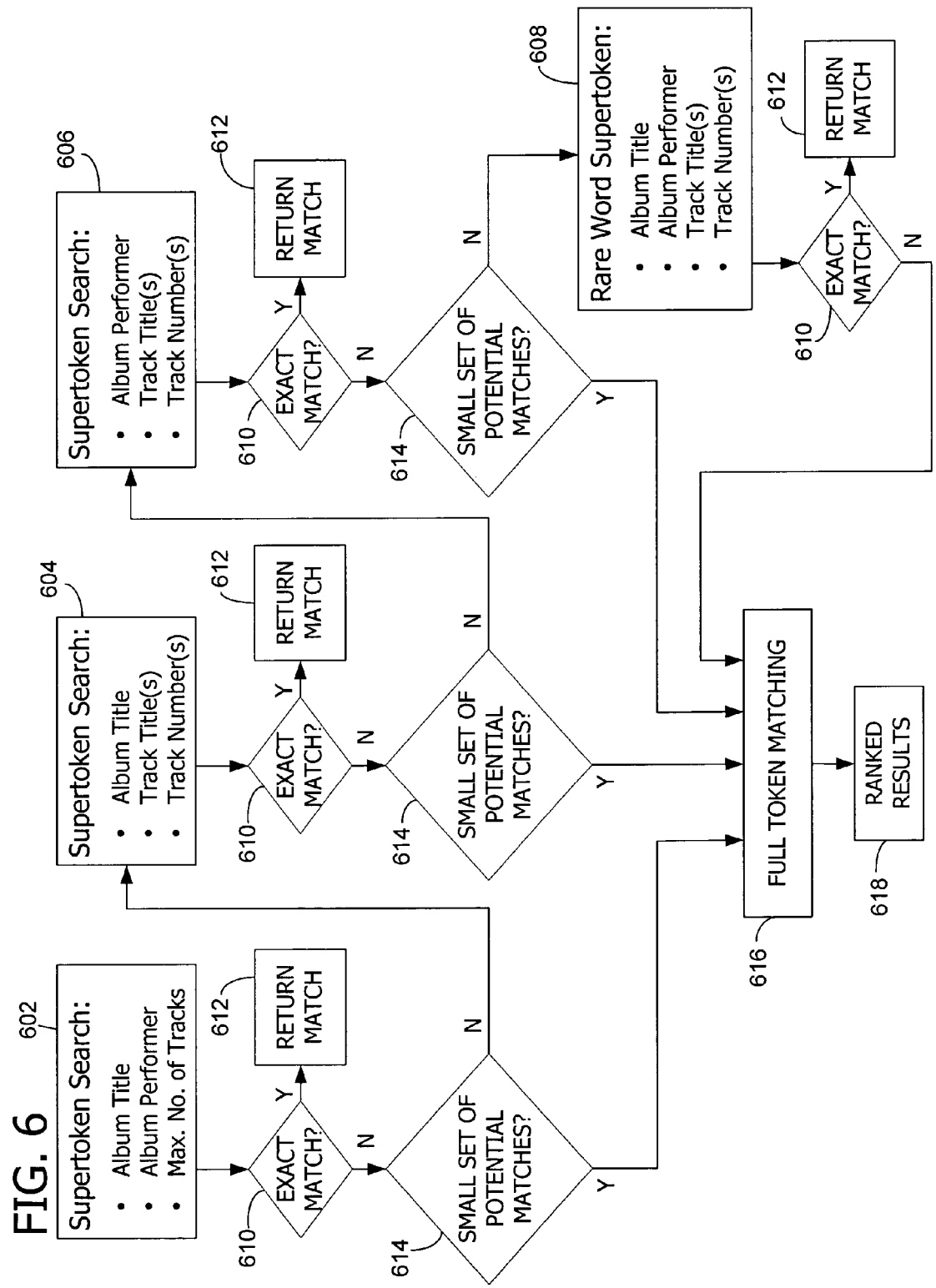
FIG. 6 is an exemplary block diagram illustrating a multi-level matching approach to identifying metadata.

Referring next to FIG. 6, an exemplary block diagram illustrates a multi-pass matching approach of the invention. As a super-token search may yield a small set of matches with a reduced amount of processing by the invention software, super-token searches 602, 604, 606, 608 are attempted as an initial pass. The invention software performs searches based on various combinations of super-tokens created for the various types of metadata received in the request from the computing device. If an exact match is found at 610 during any super-token search, the match is communicated to the requesting device at 612. If searching the database yields a small result set at 614 (e.g., less than fifty potential matches), the invention software performs a search using all the extracted tokens at 616 (e.g., full token matching) as a second pass. This second pass performs a more intensive search on the smaller constrained set of results obtained during the first pass to generate ranked search results at 618.

In the example of FIG. 6, a search is performed on super-tokens associated with an album title, an album performer, and the maximum number of tracks at 602 as identified in the received request. If a large set of potential matches is identified during this search, the invention software performs another search on super-tokens associated with an album title, a track title, and a track number at 604. If a large set of potential matches is identified during this search, the invention software performs another search on super-tokens associated with an album performer, a track title, and a track number at 606. If a large set of potential matches is identified during this search, the invention software performs a rare word super-token search at 608 using tokens with low frequency yet high significance from the album title, album performer, track title, and track number categories. If an exact match is not produced from this search, the invention software performs full token matching at 616.

Full token matching produces a ranked list of potential matches at 618 (e.g., a list of potentially relevant items of media content) for delivery to the computing device. In one embodiment, input tokens either do or do not match tokens associated with media content and stored in a metadata database. In an alternative embodiment, the text matching operation considers an edit distance between tokens. While a synonym set accounts for common misspellings and alternate forms of tokens, the edit distance between tokens represents another pass in determining the best match.

The popularity of a particular search is also considered in matching input metadata to standardized metadata. Popularity may be used as a basis for evaluating potential matches that are otherwise similar in terms of tokens. Users are familiar with search results being ordered on the basis of popularity.

One or more computer-readable media have computer-executable instructions for performing the method illustrated in FIG. 6.

First Pass: Super-tokens

The super-token searches are performed using initial sub-string matches against super-tokens constructed from the standardized data set. That is, the standardized metadata has super-tokens associated therewith (see FIG. 8). The goal of the sub-string search is to produce a single unique result or to produce a small set of possible matches to pass forward for further processing. A threshold value determines the acceptable size of the set of initial matches. If the size of the set of initial matches exceeds the threshold value, the search results are discarded and other searching is performed.

Various super-token searches may be attempted using various combinations of fields or domains of data as a single incorrect input string may cause the initial searches to fail. Successful searches generally start with the most unique match and progress to the least unique match. For example, consider searching on the following input strings: Artist="Beatless", Album="Sgt. Peppers" and Track="Lucy in the Sky". Because the single token in the artist name has been spelled incorrectly, any super-token search which includes the artist name will likely fail to provide a match. However, any super-token search using the album and track input strings would most likely identify the correct music track in the standardized metadata referred to by these metatags.

Second Pass: Full Token Matching

While the super-token search reduces the number of possible matches, the super-token search may fail to identify a single set of standardized metadata matching the metadata received in the request received from the client. A second pass based on a full tokenization of the input strings is performed. The second pass is a more expensive search in terms of server resources. The increase in resource utilization is due to the expanding number of occurrences of each of the search terms.

The invention provides tunable thresholds to reduce the amount of search terms to be considered during the second pass. For example, full token matching may be performed on the type or category of metadata that was not used to produce the match results during the first pass. For example, if a search was performed with a super-token representing the album title and artist name, then full token matching may be performed on tokens relating to the track titles. In another example, if a search was performed with a super-token representing the artist name and a set of track titles, then full token matching may be performed on the album title.

Another threshold relates to a frequency of occurrence in the standardized metadata. The invention assigns a weight to each of the tokens based on a frequency of occurrence in the standardized data to provide a measure of the relative value of each of the tokens in the input. For instance, a token such as "ROCK" which has a high frequency of occurrence is not a valuable token for making a unique match. However, a token such as "ZWAN" is a valuable one in making a unique match. During fill token matching, the invention software ranks the search results (e.g., a list of items of media content) according to the assigned weights.

Figure 8:
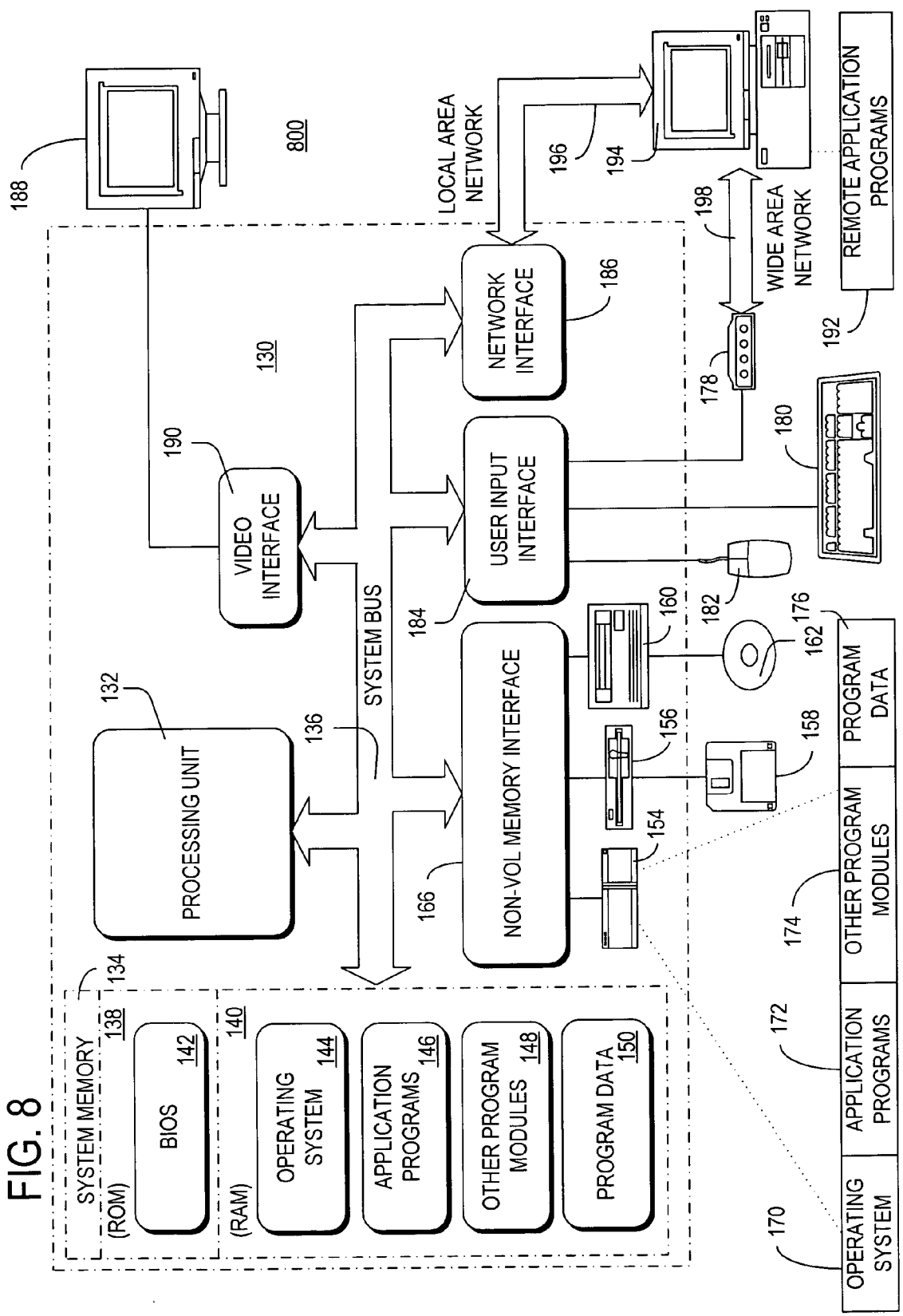
FIG. 8 is a block diagram illustrating one example of a suitable computing system environment in which the invention may be implemented.

Similar weighting techniques are applied to the standardized metadata (see FIG. 8). Each token in the standardized data is similarly weighted and ranked based on its value to a particular item of media content. Frequency-based weighting also enables evaluation of the relative worth of one potential match over another potential match. For example, the invention software sums the weights of all the input tokens and factors in the sum to each potential match result. A single value may be produced which indicates the relative worth of one match result over another match result.

For example, weighted input tokens for a metadata text string for an album title may be ranked in decreasing order of significance as follows: "SERGEANT", "PEPPERS", "LONELY", "HEARTS", and "CLUB". Table 4 lists exemplary percentile weight for tokens stored with the standardized metadata.

TABLE 4

Percentile weight for tokens associated with the standardized metadata.

| TOKENS | PERCENTILE WEIGHT |
|---|---|
| Sgt | 0.37 |
| Peppers | 0.63 |
| Lonely | 6.3 |
| Hearts | 8.0 |
| Club | 33.5 |
| Band | 51.2 |

Response:

The invention software constructs a response (e.g., as an XML document) which includes, but is not limited to, unique identifiers for each item of media content (e.g., each music track) identified during the search along with the standardized metadata for each of the mapped items of media content. In an audio example, the standardized metadata includes one or more of the following: an album title, an album performer (e.g., an artist name), a track title, a track performer (e.g., an artist name), and a track number.

In some embodiments, other metadata is also returned. In an audio example, the invention software returns all music tracks included in the standardized metadata for the entire album even if only one music track from that album is present in the initial request. This allows the client of the service to cache the metadata for an entire album. In another embodiment, the service simply returns the metadata for the track specified in the request.

Populating the Database with Standardized Metadata

Figure 7:
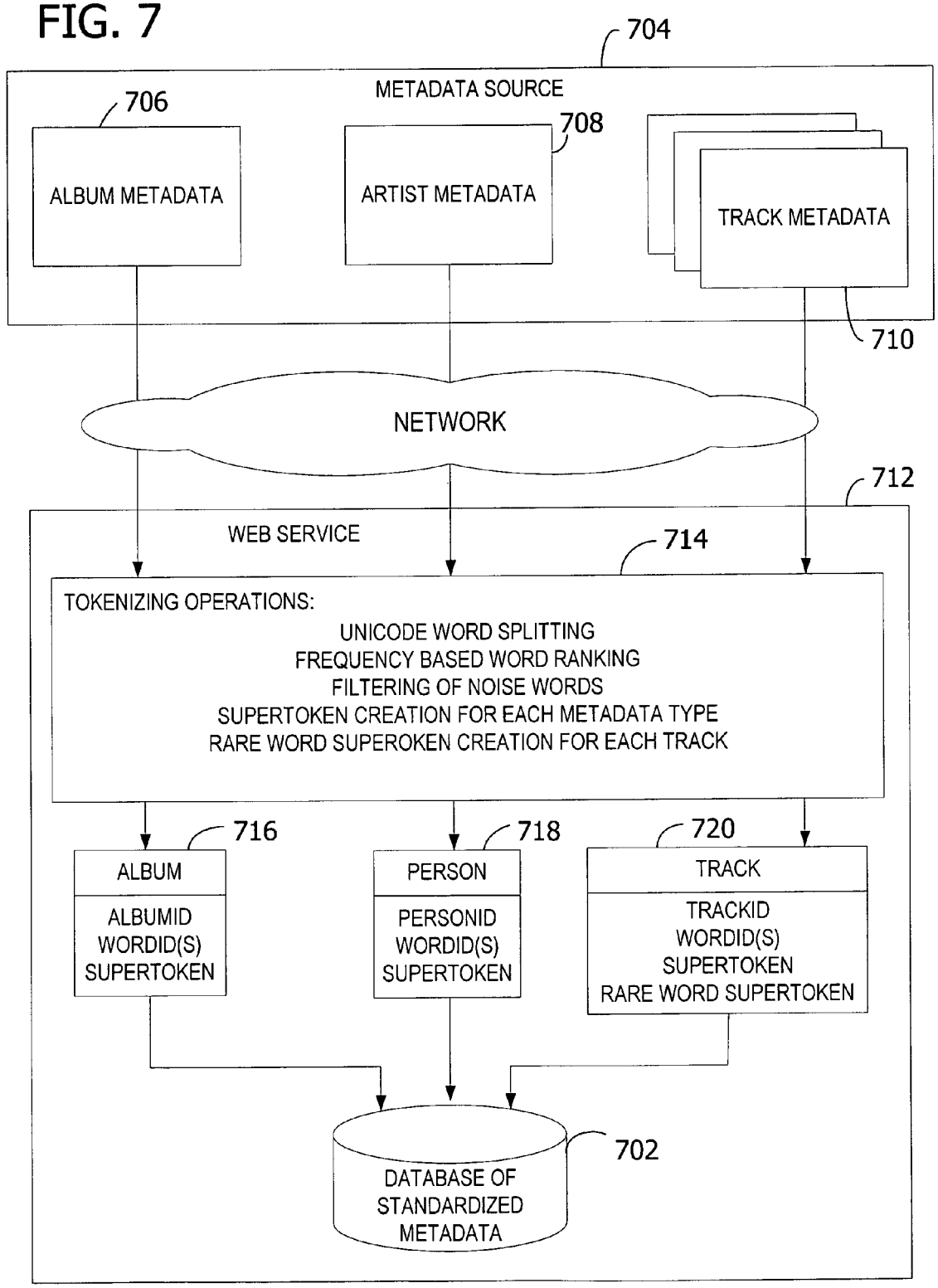
FIG. 7 is an exemplary block diagram illustrating population of a database with metadata from a metadata source.

Referring next to FIG. 7, an exemplary block diagram illustrates population of a database with standardized metadata 702 from a metadata source 704 or other metadata provider. The metadata source 704 sends metadata such as album metadata 706, person (e.g., artist) metadata 708, and track metadata 710 to the web service 712 or other implementation of the invention. The web service 712 processes the input metadata for storage on a computer-readable medium (e.g., database 702) via various tokenizing operations 714. The web service 712 receives one or more metadata items such as metadata 706, 708, 710 related to media content from the metadata source 704. The web service 712 extracts one or more tokens from the received metadata items and selects a plurality of the extracted tokens to create a token group. Selecting the plurality of the extracted tokens includes creating a token group for each category of metadata (e.g., album metadata 706, person metadata 708, and track metadata 710).

In one embodiment, tokenizer component 404 of FIG. 4 performs the various tokenizing operations 714. For example, tokenizer component 404 implements data cleansing by omitting an extracted word based on its level of descriptiveness of the media content (e.g., filtering noise words), performing unicode word splitting, creating super-tokens and rare word super-tokens for each metadata type, and performing frequency-based word ranking. Frequency-based word ranking includes assigning a weight to each of the extracted tokens based on the frequency of occurrence of the extracted token in the received metadata items. The web service 712 stores the received metadata items, the extracted tokens, and the created token group on database 702 as data structures 716, 718, 720 to associate the media content with the stored metadata items, tokens, and token group for future searching. When later providing search results to a requesting device, the web service 712 ranks the results based on the assigned weights.

In one form, the web service 712 stores each metadata item as a data structure including, but not limited to, one or more of the following: an item identifier (e.g., albumID), one or more tokens (e.g., WordID), a token group (e.g., a super-token), a rare work super-token, a type (e.g., artist, album, or track), and a frequency weighting associated with the token group.

One or more computer-readable media have computer-executable instructions for performing the method illustrated in FIG. 7.

Exemplary Operating Environment

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 3 to match initial metadata to standardized metadata provided by the metadata provider.

EXAMPLES

The following examples further illustrate the invention. The contents of a sample XML request document are shown below.

```
<METADATA><MDQ-CD><mdqRequestID>2234CE12-E51B-43D1-9326-
FD2721C6D145</mdqRequestID><album><title><text>SergeantPeppers</text>
<word>Sergeant</word><word>Peppers</word></title><artist><text>Beatles</
text><word>Beatles</word></artist></album><track><title><text>Lovely-
Rita</text><word>Lovely</word><word>Rita</word></title><artist>
<text>Beatles</text><word>Beatles</word></artist><filename>Beatles--Lovely
Rita.mp3</filename><trackDuration>162150</trackDuration><trackRequestID>0
</trackRequestID></track></MDQ-CD></METADATA>
```

The contents of a sample XML response document are shown in Appendix A.

Other

Those skilled in the art will note that the order of execution or performance of the methods illustrated and described herein is not essential, unless otherwise specified. That is, elements of the methods may be performed in any order, unless otherwise specified, and that the methods may include more or less elements than those disclosed herein.

Unless otherwise noted, the example album titles, song titles, artist names, companies, organizations, products, domain names, uniform resource locators, e-mail addresses, logos, people, places and events depicted herein are fictitious, and no association with any real album title, song title, artist name, company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

The contents of a sample XML response document are shown below.

```
<METADATA><mdqRequestID>{00000000-0000-0000-0000-
000000000000}</mdqRequestID><ResponseCode>Album
Mode</ResponseCode><ResponseCode>Unique Album/Performer/Track
Match</ResponseCode><MDR-
CD><version>4.0</version><mdqRequestID>{00000000-0000-0000-0000-
000000000000}</mdqRequestID><WMCollectionID>DB702D8E-2C75-42E4-983B-
CF0822F33451</WMCollectionID><WMCollectionGroupID>DB702D8E-2C75-42E4-
983B-CF0822F33451</WMCollectionGroupID><uniqueFileID>AMGa_id=R
1521</uniqueFileID><albumTitle>Sgt. Pepper's Lonely Hearts Club
Band</albumTitle><albumArtist>The Beatles</albumArtist><releaseDate>1967-
06-01</releaseDate><label>Capitol</label><genre>Rock</genre>
<providerStyle>Rock</providerStyle><publisherRating>9</publisherRating>
<buyParams>providerName=AMG&albumID=DB702D8E-2C75-42E4-983B-
CF0822F33451&a_id=R%20%20%20%20%201521&album=
Sgt.%20Pepper's%20Lonely%20Hearts%20Club%20Band&artistID=40399E69-0E27-4553-
9399-
66B446C53DD6&p_id=P%20%20%20%20%203644&artist=The%20Beatles</
buyParams><largeCoverParams>200/drc500/c529/C5293648k41.jpg</largeCoverParams>
<smallCoverParams>075/drc500/c529/c5293648k41.jpg</smallCoverParams>
<moreInfoParams>a_id=R%20%20%20%20%201521</moreInfoParams><dataProvider>
AMG</dataProvider><dataProviderParams>Provider=AMG</dataProviderParams>
<dataProviderLogo>Provider=AMG</dataProviderLogo><track><trackRequestID>
</trackRequestID><WMContentID>C1796153-99BC-4644-932E-
ECAB98E3FC93</WMContentID><trackTitle>Sgt. Pepper's Lonely Hearts Club
Band</trackTitle><uniqueFileID>AMGp_id=P      3644;AMGt_id=
T23438</uniqueFileID><trackNumber>1</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>
A4544145-C7DC-417A-92E1-7D8FCD15EC6B</WMContentID><trackTitle>With a Little Help
from My Friends</trackTitle><uniqueFileID>AMGp_id=P      3644;AMGt_id=
T23439</uniqueFileID><trackNumber>2</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>11A0DFAF-
ECD5-40BB-9646-3380947991F6</WMContentID><trackTitle>Lucy in the Sky With
Diamonds</trackTitle><uniqueFileID>AMGp_id=P      3644;AMGt_id=
T23440</uniqueFileID><trackNumber>3</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>2B7E9EC3-
```

APPENDIX A-continued

The contents of a sample XML response document are shown below.

```
2D2B-4FD3-896E-94CAD725F0E9</WMContentID><trackTitle>Getting
Better</trackTitle><uniqueFileID>AMGp_id=P    3644;AMGt_id=
T23441</uniqueFileID><trackNumber>4</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>38FE4F16-
8A1A-4313-A063-3D588F124BD5</WMContentID><trackTitle>Fixing a
Hole</trackTitle><uniqueFileID>AMGp_id=P    3644;AMGt_id=
T23442</uniqueFileID><trackNumber>5</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>D376B180-
304A-48F8-97E5-0B0B6664E2D8</WMContentID><trackTitle>She's Leaving
Home</trackTitle><uniqueFileID>AMGp_id=P    3644;AMGt_id=
T23443</uniqueFileID><trackNumber>6</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>5E2A612F-
F21A-4DDD-AA03-B36113FA637F</WMContentID><trackTitle>Being for the
Benefit of Mr. Kite</trackTitle><uniqueFileID>AMGp_id=
P3644;AMGt_id=
T23444</uniqueFileID><trackNumber>7</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>D707043E-
2D7E-4346-A18A-516FB4FD8A43</WMContentID><trackTitle>Within You, Without
You</trackTitle><uniqueFileID>AMGp_id=P    3644;AMGt_id=
T23445</uniqueFileID><trackNumber>8</trackNumber><trackPerformer>The
Beatles</trackPerformer><trackComposer>George
Harrison</trackComposer><trackConductor></trackConductor><period></
period></track><track><trackRequestID></trackRequestID><WMContentID>EC93F7D3-
68CC-404A-A768-1987EC8FF8C9</WMContentID><trackTitle>When I'm Sixty-
Four</trackTitle><uniqueFileID>AMGp_id=P    3644;AMGt_id=
T23446</uniqueFileID><trackNumber>9</trackNumber><trackPerformer>The
Beatles</trackPerformer><trackComposer>John Lennon; Paul
McCartney</trackComposer><trackConductor></trackConductor><period></
period></track><track><trackRequestID>0</trackRequestID><WMContentID>4293121F-
5361-4BC5-A6DF-5408206EE3AB</WMContentID><trackTitle>Lovely
Rita</trackTitle><uniqueFileID>AMGp_id=P    3644;AMGt_id=
T23447</uniqueFileID><trackNumber>10</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>41192920-
51BC-4A9E-83B5-CDBF0B73D36D</WMContentID><trackTitle>Good Morning, Good
Morning</trackTitle><uniqueFileID>AMGp_id=P    3644;AMGt_id=
T23448</uniqueFileID><trackNumber>11</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>B663126A-
D816-43D1-B321-692C5F471887</WMContentID><trackTitle>Sgt. Pepper's Lonely
Hearts Club Band (Reprise)</trackTitle><uniqueFileID>AMGp_id=
P3644;AMGt_id=
T23449</uniqueFileID><trackNumber>12</trackNumber><trackPerformer>The
Beatles</trackPerformer><trackComposer>John Lennon; Paul
McCartney</trackComposer><trackConductor></trackConductor><period></
period></track><track><trackRequestID></trackRequestID><WMContentID>179E570D-
8CAA-4C11-9906-C1D76BC9C029</WMContentID><trackTitle>A Day in the
Life</trackTitle><uniqueFileID>AMGp_id=P    3644;AMGt_id=
T23450</uniqueFileID><trackNumber>13</trackNumber><trackPerformer>The
Beatles</trackPerformer><trackComposer>John Lennon; Paul
McCartney</trackComposer><trackConductor></trackConductor><period></
period></track></MDR-CD>
<Backoff><Time>30</Time></Backoff></METADATA>
```

What is claimed is:

1. A method for providing metadata associated with media content and stored in a database on a first computing device, said method comprising:

receiving, by the first computing device from a second computing device storing a media file storing media content, a request comprising an item of initial metadata identified by the media file, wherein said request is in response to selecting of the media file via a media player by a user of the second computing device;

extracting one or more tokens from the item of initial metadata in the received request, each of said extracted tokens representing a portion of the item of initial metadata;

assigning a weight to each of the extracted tokens, said assigned weight corresponding to a frequency of occurrence of the extracted token in standardized metadata stored in the database;

selecting a plurality of the extracted tokens to create a token group;

searching the database on the first computing device for additional metadata associated with the media content using the created token group, wherein the token group comprises a text string and searching the database comprises searching the database using a substring of less than the entire text string, said searching comprising generating a list of items of media content ordered according to the assigned weights; and providing the additional metadata associated with the media content from the database on the first computing device to the second computing device wherein the additional metadata provided to the first computing device comprises the generated list of items of media content.

2. The method of claim 1, wherein searching the database comprises searching the database for additional metadata, said additional metadata representing standardized metadata.

3. The method of claim 1, wherein selecting the plurality of the extracted tokens comprises creating a permutation of the extracted tokens.

4. The method of claim 1, wherein extracting one or more tokens comprises extracting one or more metatags from the item of initial metadata in the received request, each of said metatags specifying textual information.

5. The method of claim 1, wherein the created token group comprises a text string including a plurality of words, and wherein searching the database comprises searching the database using less than all of the plurality of words.

6. The method of claim 1, wherein searching the database produces additional metadata relating to a single item of media content, and further comprising identifying the additional metadata and the single item of media content to the second computing device.

7. The method of claim 1, wherein searching the database produces an unranked list of items of media content.

8. The method of claim 7, further comprising sending the unranked list of items of media content to the second computing device.

9. The method of claim 7, further comprising:
searching the database using the extracted tokens to produce another list of items of media content;
ranking the other list of items of media content; and
sending the ranked list of items of media content to the second computing device.

10. The method of claim 9, wherein ranking the other list of items of media content comprises considering an edit distance between the extracted tokens.

11. The method of claim 9, wherein ranking the other list of items of media content comprises considering the popularity of each of the items of media content in the other list.

12. The method of claim 7, further comprising searching the database using a variation of one or more of the extracted tokens.

13. The method of claim 1, further comprising cleansing the extracted tokens by removing punctuation from the extracted tokens.

14. The method of claim 1, wherein receiving the request comprises receiving the request with a plurality of items of initial metadata, each of said items of initial metadata corresponding to one or more of the following: album title, artist, track title, and track number.

15. The method of claim 1, wherein receiving the request comprises receiving the request with a plurality of items of initial metadata each corresponding to one of a plurality of categories, and wherein searching the database comprises searching the database based on the items corresponding to one of the categories.

16. The method of claim 15, further comprising performing additional searching based on the items corresponding to at least one of the other categories.

17. The method of claim 15, wherein the categories comprise at least one of the following: album title, artist name, and song title.

18. One or more computer-readable storage medium having computer-executable instructions for performing the method recited in claim 1.

19. A method for providing standardized metadata associated with media content and stored in a database on a first computing device, said method comprising:

selecting a media file storing media content via a media player, said media file stored on a second computing device, wherein said selecting is performed by a user of the second computing device;

receiving, from the second computing device storing the media file having the media content, a request comprising metadata associated with said media content, said metadata including text strings corresponding to an album title, an artist name, and a track title, wherein said request is in response to selecting of the media file via a media player by a user of the second computing device;

extracting one or more tokens from the text strings, each of said extracted tokens representing a substring of the text strings;

assigning a weight to each of the extracted tokens, said assigned weight corresponding to a frequency of occurrence of the external token in the standardized metadata stored in the database;

selecting a plurality of the extracted tokens from the album title text string and the artist name text string to create a first token group;

searching the database on the first computing device for additional metadata associated with the media content using the first token group, said searching comprising generating a list of items of media content ordered according to the assigned weights;

modifying one or more of the extracted tokens to create various keyword groups;

searching the database using the various keyword groups to yield a plurality of results;

selecting a plurality of the extracted tokens from the album title text string and the track title text string to create a second token group;

searching the database for additional metadata associated with the media content using the second token group to yield another plurality of results;

selecting a plurality of the extracted tokens from the artist name text string and the track title text string to create a third token group;

searching the database for additional metadata associated with the media content using the third token group to produce the additional metadata relating to a single item of media content; and providing the additional metadata associated with the media content and the single item of media content from the database on the first computing device to the second computing device.

20. One or more computer-readable storage medium having computer-executable instructions for performing the method recited in claim 19.

21. One or more computer-readable storage medium having computer-executable components for providing metadata associated with media content and stored in a database on a first computing device, said components comprising:
    a user interface component of a media player for enabling a user of a second computing device to select a media file stored on the second computing device, said media file storing media content;
    an interface component for receiving, from the second computing device, a request comprising an item of initial metadata identified by the selected media file stored on said second computing device, said media file storing media content, wherein said request is in response to the user selecting the media file;
    a tokenizer component for extracting one or more tokens from the item of initial metadata in the request received by the interface component, each of said extracted tokens representing a portion of the item of initial metadata, said tokenizer component further selecting a plurality of the extracted tokens to create a token group;
    a weighting component for assigning a weight to each of the extracted tokens, said assigned weight corresponding to a frequency of occurrence of the extracted token in the metadata stored in the database; and
    a query component for searching the database on the first computing device for additional metadata associated with the media content using the token group created by the tokenizer component and for providing the additional metadata from the database on the first computing device to the second computing device, wherein searching the database comprises generating a list of items of media content ordered according to the assigned weights of the extracted tokens, wherein the second computing device updates metadata associated with the media file stored on the second computing device with the additional metadata from the database, wherein the request comprises a plurality of items of initial metadata each corresponding to one of a plurality of categories, and wherein the query component searches the database based on the items corresponding to one of the categories, wherein the query component further performs additional searching based on the items corresponding to at least one of the other categories, and wherein the query component produces additional metadata relating to a single item of media content and further identifies the additional metadata and the single item of media content to the second computing device.

22. The computer-readable storage medium of claim 21, wherein the tokenizer component creates the token group as a text string, and wherein the query component searches the database using a substring of the created text string.

23. The computer-readable storage medium of claim 21, wherein the interface component receives the request with a plurality of items of initial metadata, each of said plurality of items of initial metadata corresponding to one or more of the following: album title, artist, track title, and track number.

24. The computer-readable storage medium of claim 21, wherein the categories comprise at least one of the following: album title, artist name, and song title.

25. A system for receiving a request from a first computing device, said request comprising an item of initial metadata identified by a media file stored on said first computing device, said media file storing media content, said system comprising:
    a user interface component of a media player for enabling a user of the first computing device to select the media file stored on the first computing device from which the item of initial metadata is identified, wherein the request is in response to the user selecting the media file;
    a tokenizer component for extracting one or more tokens from the item of initial metadata in the received request, each of said extracted tokens representing a portion of the item of initial metadata, said tokenizer component further selecting a plurality of the extracted tokens to create a token group;
    a database on a second computing device storing additional metadata relating to the media content;
    a weighting component for assigning a weight to each of the extracted tokens, said assigned weight corresponding to a frequency of occurrence of the extracted token in standardized metadata stored in the database; and
    a query component for searching the database for the additional metadata associated with the media content using the created token group and for providing the additional metadata from the database on the second computing device to the first computing device, wherein searching the database comprises generating a list of items of media content ordered according to the assigned weights of the extracted tokens, wherein the request comprises a plurality of items of initial metadata each corresponding to one of a plurality of categories, and wherein the query component searches the database based on the items corresponding to one of the categories, and wherein the query component further performs additional searching based on the items corresponding to at least one of the other categories.

26. The system of claim 25, wherein the tokenizer component creates the token group as a text string, and wherein the query component searches the database using a substring of the created text string.

27. The system of claim 25, wherein the query component produces additional metadata relating to a single item of media content and further identifies the additional metadata and the single item of media content to the first computing device.

28. The system of claim 25, wherein the system receives the request with a plurality of items of initial metadata, each of said plurality of items of initial metadata corresponding to one or more of the following: album title, artist, track title, and track number.

29. The system of claim 25, wherein the categories comprise at least one of the following: album title, artist name, and song title.

30. A computer-readable storage medium of a first computing device having stored thereon a data structure describing an item of media content, said data structure comprising:
    a plurality of metadata items including a metadata item associated with the media content;
    one or more tokens, each of said tokens representing a portion of the metadata item;
    a weight associated with each text string, said weight representing a frequency of occurrence of the text string in the metadata item associated with the media content; and
    a token group including one or more of the tokens, wherein a second computing device stores the media content, and wherein the metadata item is provided to the second computing device from the first computing device responsive to a request from the second computing device as a function of comparing a token group identified in the request with the token group of said data structure, said token group identified in the request being associated with the media content stored by the second computing device, said media content stored in a media file selected by a user of the second computing device via a media player, wherein comparing a token group identified in the request with the token group of said data structure comprises generating a list of items of media content ordered according to the assigned weights, and wherein the request is in response to the user selecting the media file, wherein each of the tokens comprises a text string including a plurality of words, and further comprising a weight associated with each word of the text string, said weight representing a frequency of occurrence of the word of the text string in the metadata item.

31. The computer-readable storage medium of claim 30, wherein the token group comprises a permutation of a plurality of the tokens.

32. The computer-readable storage medium of claim 30, wherein the metadata item comprises one of the following: an album title, an artist, a track title, and a track number.

33. A method of processing data via a first computing device for storage on a computer-readable storage medium, of the first computing device said method comprising:
   receiving one or more metadata items at the first computing device from a metadata source, said metadata items being related to media content;
   extracting one or more tokens from the received metadata items, each of said extracted tokens representing a portion of one or more of the received metadata items;
   assigning a weight to each of the extracted tokens based on the frequency of occurrence of the extracted token in the metadata items;
   ranking each of the extracted tokens for each of the metadata items based on the assigned weight;
   selecting a plurality of the extracted tokens to create a token group; and
   storing the received metadata items, the extracted tokens, and the created token group on the computer-readable medium of the first computing device to associate the media content with the stored metadata items, tokens, and token group, wherein a second computing device stores the media content, said media content stored in a media file selected by a user of the second computing device via a media player, and wherein at least one of the metadata items is provided from the first computing device to the second computing device responsive to a request from the second computing device as a function of comparing a token group identified in the request with the token group stored on the computer-readable medium of the first computing device, said token group identified in the request being associated with the media content stored by the second computing device, wherein the created token group comprises a text string and wherein comparing a token group identified in the request with the token group stored on the computer-readable medium of the first computing device comprises comparing a token group identified in the request with the token group stored on the computer-readable medium of the first computing device using a substring of less than the entire text string, and wherein the request is in response to the user selecting the media file.

34. The method of claim 33, wherein each of the received metadata items corresponds to a category of metadata, and wherein selecting the plurality of the extracted tokens comprises creating a token group for each category of metadata.

35. The method of claim 33, wherein the metadata items each comprise a text string having one or more words, and wherein extracting one or more tokens comprises extracting each word from the text string.

36. The method of claim 35, wherein extracting one or more tokens further comprises omitting an extracted word based on its level of descriptiveness of the media content.

37. One or more computer-readable storage medium having computer-executable instructions for performing the method recited in claim 33.

* * * * *